Figure 4:
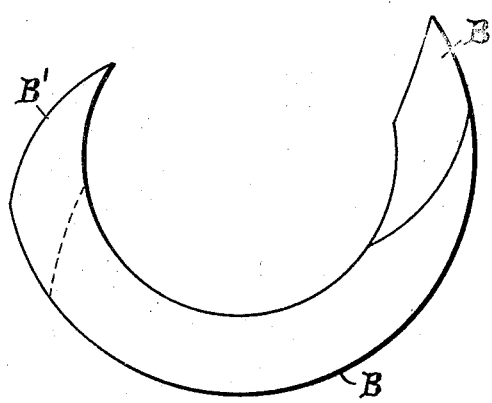

C. W. G. KING.
SECTIONAL RING FOR ROD PACKING.
APPLICATION FILED JAN. 16, 1913.
1,084,281.
Patented Jan. 13, 1914.
3 SHEETS—SHEET 1.
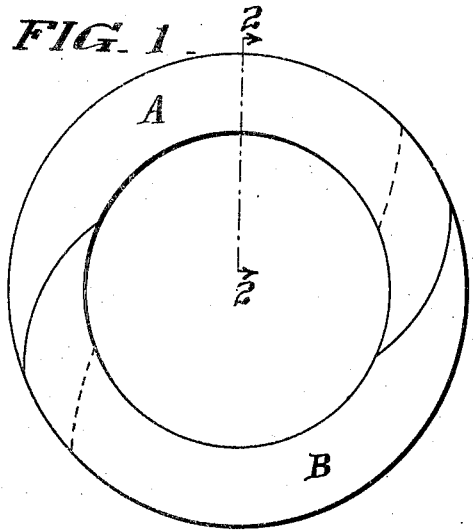
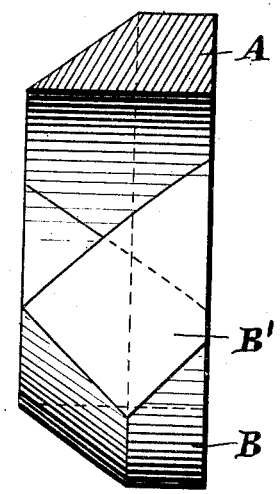
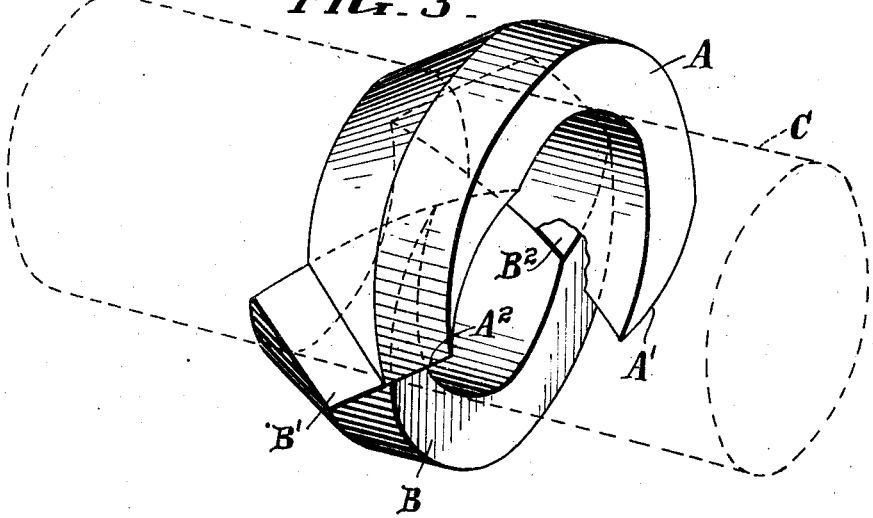

C. W. G. KING.
SECTIONAL RING FOR ROD PACKING.
APPLICATION FILED JAN. 16, 1913.

1,084,281.

Patented Jan. 13, 1914.

3 SHEETS—SHEET 2.

WITNESSES

INVENTOR

BY

ATTORNEY

C. W. G. KING.
SECTIONAL RING FOR ROD PACKING.
APPLICATION FILED JAN. 16, 1913.

1,084,281.

Patented Jan. 13, 1914.

3 SHEETS—SHEET 3.

WITNESSES

INVENTOR
Charles W. G. King
BY
ATTORNEY

UNITED STATES PATENT OFFICE.

CHARLES W. G. KING, OF PHILADELPHIA, PENNSYLVANIA, ASSIGNOR TO THE UNITED STATES METALLIC PACKING COMPANY, OF PHILADELPHIA, PENNSYLVANIA, A CORPORATION OF PENNSYLVANIA.

SECTIONAL RING FOR ROD-PACKING.

1,084,281.  Specification of Letters Patent.  Patented Jan. 13, 1914.

Application filed January 16, 1913. Serial No. 742,366.

*To all whom it may concern:*

Be it known that I, CHARLES W. G. KING, a citizen of the United States of America, residing in the city and county of Philadelphia, in the State of Pennsylvania, have invented certain new and useful Improvements in Sectional Rings for Rod-Packings and other Purposes, of which the following is a true and exact description, reference being had to the accompanying drawings, which form a part thereof.

My present invention relates to sectional rings, adapted for use as metallic rod packing rings, and for other purposes. The primary object of my invention is to provide a ring formed of two sections each having a rod engaging surface extending substantially more than half way around a rod on which the assembled ring fits, and each being separately movable laterally onto and off the rod; the sections being so formed, moreover, that after being put in place on longitudinally displaced portions of the rod, they may be moved along the rod into and out of a position in which they unite to form a complete ring encircling the rod, and when so assembled into a complete ring interlock to mutually prevent the lateral displacement from the rod of either section.

In constructing my improved ring, I form each ring section with end surfaces which are screw surfaces intersecting the inner curved surface of the ring in helical lines which are in substantially diametrical opposition to one another. The screw surfaces at the end of each section fit against the screw surfaces of the other section in the assembled ring and the movement along the rod of one section relative to the other necessary in assembling or separating the ring sections is a screw motion about the common axis of the ring and rod. These screw surfaces may be true helical surfaces of the same pitch or they may be varied somewhat therefrom, as hereinafter explained, to facilitate the assembly and taking apart of the ring.

Each pair of mating surfaces may be so shaped that one, which may be regarded as a female screw surface, overlies the other, which may be regarded as a male screw surface. In this case, the screw surfaces in which the opposite ends of one ring section terminate may both be male screw surfaces, and the ends of the other section will then both terminate in female screw surfaces. In general, however, I prefer the ring sections to be counter parts of one another, except when the end surfaces are modified as hereinafter explained. For some purposes, and especially where the ring is to serve as a soft metal rod packing ring, I prefer that the mating surfaces shall overlap, although this is not essential for the interlocking of the ring sections. On the contrary, the ring sections will interlock even though the mating surfaces are so formed that a perpendicular from the axis of the ring to any point along the inner margins of the joints between the assembled ring sections will pass between the two sections without intersecting either. The rod engaging surface of each ring section constructed in accordance with my present invention will always extend substantially more than 180 degrees about the axis of the rod, but the arc of contact in any one plane transverse to the axis of the ring may and should be exactly or approximately 180 degrees.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described forms in which my invention may be embodied.

Figure 5:
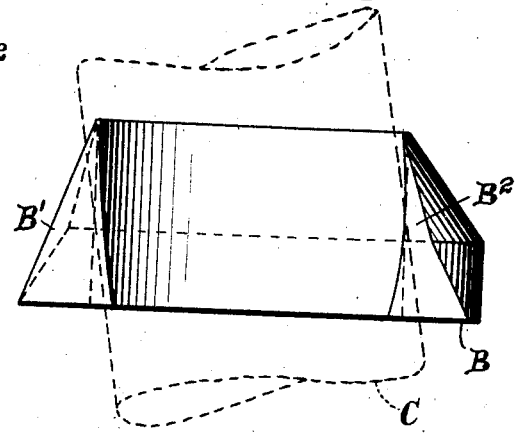
Figure 6:
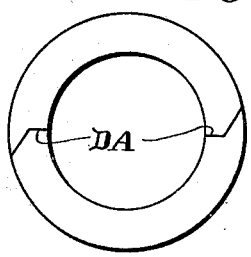
Figure 7:
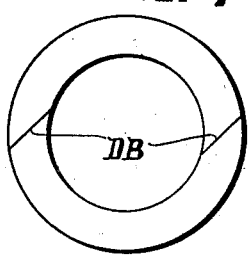
Figure 8:
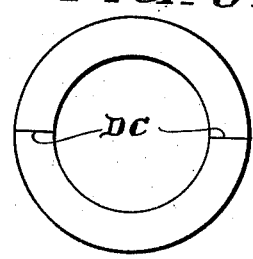
Figure 9:
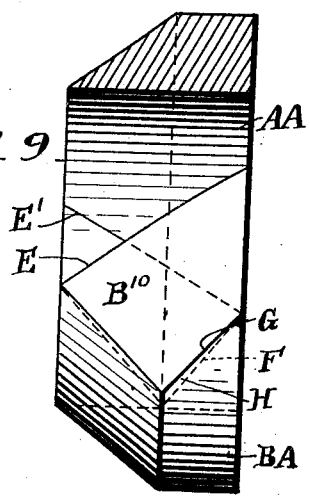
Figure 10:
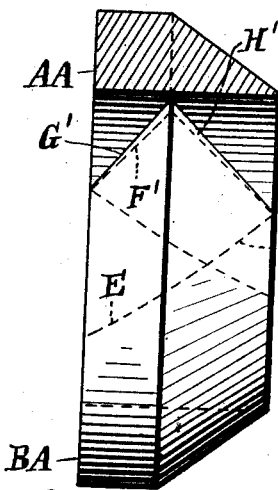
Figure 11:
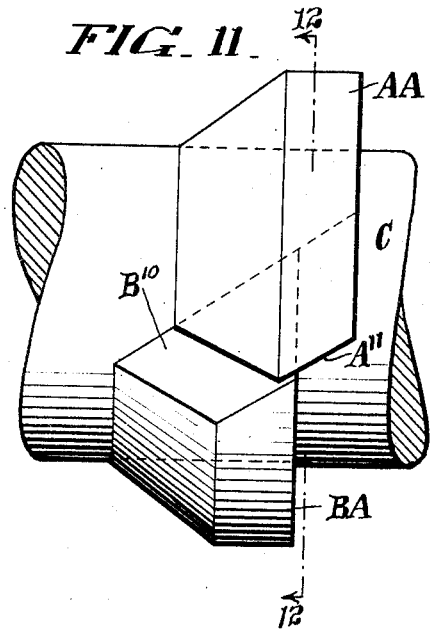
Figure 12:
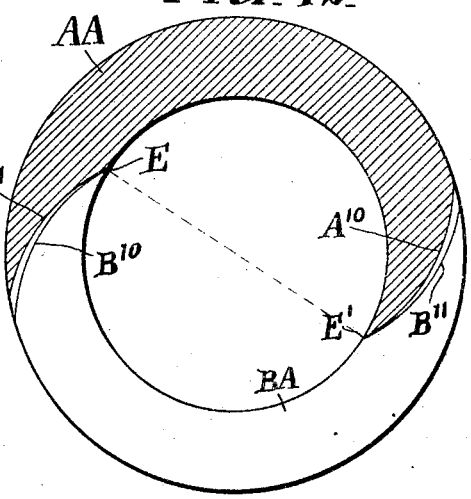
Figure 13:
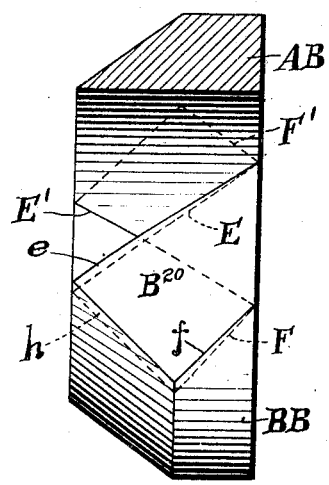
Figure 14:
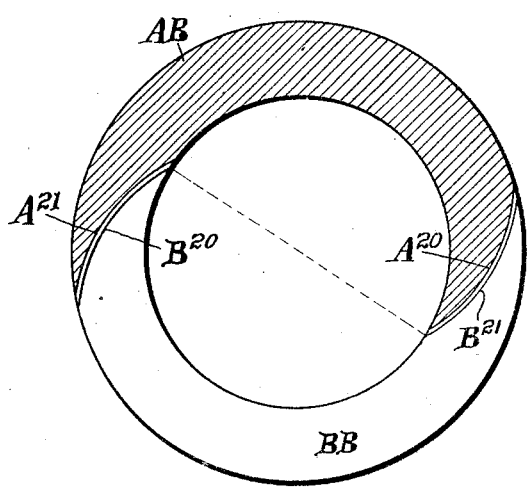

Of the drawings: Figure 1 is an end elevation of one form of rod packing ring constructed in accordance with my present invention. Fig. 2 is a side elevation of the ring shown in Fig. 1, partly in section on the line 2—2 of Fig. 1. Fig. 3 is a perspective view of a rod with the parts of the ring shown in Figs. 1 and 2 partially screwed together thereon. Fig. 4 is an end elevation of one section of the ring shown in Figs. 1 and 2. Fig. 5 is a plan view of the ring section shown in Fig. 4 with the rod with which it is to be used shown in dotted lines in the position relative to the ring occupied by it at an intermediate stage in the operation of putting the ring section and rod together. Figs. 6, 7 and 8 are views taken similarly to Fig. 1 showing rings having mating surfaces of different shapes. Fig. 9 is an elevation of one side, and Fig. 10 is an elevation of the opposite side of a ring having its mating surfaces varied slightly from true helical surfaces to facilitate the assembly and taking apart of the ring sections. Fig. 11 is a side elevation of a rod with a ring of the construction shown in Figs. 9 and 10 partially assembled thereon. Fig. 12 is a section on the line 12—12 of Fig. 11. Fig. 13 is a view taken similarly to Fig. 9, illustrating another manner in which the mating surfaces may be modified to facilitate the assembly and taking apart of the ring sections; and Fig. 14 is a section through a partially assembled ring of the character shown in Fig. 13, the section being taken similarly to Fig. 12.

In the drawings, and referring first to the construction shown in Figs. 1 to 5, inclusive, A represents one, and B the second, of the two sections of a rod packing ring adapted to fit about a rod C. As shown, the two sections A and B are identical in form. The section A terminates at one end in a convex helical or male screw surface A' and at the other end in a concave helical or female screw surface A²; and the ring section B terminates in helical surfaces B' and B², generally similar, respectively, to the surfaces A' and A². In the assembled ring the surfaces A' and B², and B' and A² fit against one another. As the mating surfaces are screw surfaces, it is obvious that the two sections after being put in place on longitudinal displaced portions of the rod C, may be moved together by giving one a screw motion relative to the other about the axis of the rod. Furthermore, each section may be separately moved laterally onto and off the rod on which it fits. To accomplish this the ring section must be given a compound movement relative to the rod comprising an angular component about an axis radial to the rod and passing approximately through the center of the ring section, and a component parallel to said axis. When the mating surfaces are left hand screw surfaces, as in the construction illustrated in Figs. 1 to 5, the angular movement in putting each section on the rod is clockwise, as viewed from the convex side of the ring section. When the mating surfaces are right hand screw surfaces, the angular movement given each ring section in putting it in place is counter clockwise, as viewed from the convex side of the ring section. As seen in Fig. 5, therefore, the rod C must be turned in a clockwise direction as it is moved into place in the ring section A beneath it. The axial length of a ring section which may thus be moved laterally onto a rod on which it fits will increase as the pitch of the screw surfaces at the ends of the section is made coarser, but with any practical pitch a limit to the maximum limit in axial length of the ring is soon reached; although, with such rod and ring diameters and screw surface pitch as are shown in Figs. 1 to 5, the axial length of the ring might be more than twice as great as shown, without interfering with the lateral movement of each ring section on and off the rod.

Since the lateral displacement of the ring sections when assembled about a rod on which the ring fits involves a twisting of the two sections in opposite directions above a common axis, it is apparent that the sections will interlock to prevent this twisting, regardless of the exact shape of the mating end surfaces of the sections provided only that these surfaces are screw surfaces. For example, the mating screw surfaces of the ring sections may be shaped as shown in Figs. 6, 7 and 8, where the lines D A, D B and D C respectively represent the ends of the joints between the ring sections. When the parts do not fit snugly, the greater arc of contact between the ring sections and also the hug of the concave screw surfaces over the convex screw surfaces of such a construction as is shown in Figs. 1 to 5, insures a firmer interlock than is obtainable under the same conditions with such a construction as is shown in Fig. 8, for instance.

Those familiar with the use of metallic rod packings will understand that a main advantage in the use of a packing ring formed of interlocking segments is the ease with which such ring can be initially assembled in the stuffing box in which it is used, and the interlocking for this purpose would ordinarily be sufficiently good with any of the forms of mating screw surfaces referred to. I consider the overlapping concave female and convex male screw surface construction shown in Figs. 1 to 5 especially desirable in the case of soft metal packing rings, however, because of the capacity of this construction to maintain tight joints and the proper relative arrangement of the ring sections as the latter wear away and become distorted in use.

When the mating screw surfaces are true helical surfaces of the same pitch, it will be apparent that in screwing the ring sections together and apart there may be considerable friction, when the parts fit snugly, owing to the large area of the contacting screw surfaces. To reduce or entirely do away with this frictional resistance, the mating surfaces may be distorted somewhat from true helical surfaces of the same pitch, as indicated in Figs. 9 to 12 inclusive, and in Figs. 13 and 14. In the ring shown in Figs. 9 to 12, the joints between the assembled ring sections AA and BA terminate at the inner curved wall of the ring in diametrically opposed and truly helical lines E and E'. The outer edges G and G' of the joints lie above the dotted lines F and F' respectively which indicates the intersection with the periphery of the ring of truly helical surfaces intersecting the lines E and E' and also coinciding with the actual joints at the untapered end of the ring. The portions H and H' of the ring section BA which lie above the truly helical surfaces intersecting the ring along the lines E and F and E' and F' are wedge shaped, increasing in thickness with the distance from the inner curved wall of the ring and also with the distance from the untapered end of the ring. With this arrangement the mating distorted screw surfaces $A^{10}$ and $B^{11}$ and $A^{11}$ and $B^{10}$ of the two ring sections will not be in contact when the ring is partially assembled as shown in Figs. 11 and 12, except along the lines E and E', though when the ring is completely assembled as shown in Figs. 9 and 10, the surfaces $A^{10}$ and $B^{11}$ and $A^{11}$ and $B^{10}$ wedge snugly together.

With the arrangements shown in Figs. 9 to 12, the two sections of each ring are not the exact counterparts of one another and the ring sections can only be screwed together in one direction and taken apart in the reverse direction. It is apparent, however, that the rod engaging surfaces of the two ring sections shown in Figs. 9 to 12 are identical in shape.

In the modification shown in Figs. 13 and 14, the ring joint of which the lines E' and F' represent the margins is truly helical, and the dotted lines E and F represent the margins of a corresponding helical surface at the other side of the ring. The last mentioned surface is separated from the joint surface $e, f$, at the front side of the ring by the portion $h$, which may be regarded as added to the ring section BB. The portion $h$ increases in thickness with the distance from the right hand of the ring as seen in Fig. 13, but may be of the same thickness at the inner curved surface of the ring as at the periphery of the ring. The joint surface $e f$ may or may not be truly helical, but if truly helical is of different pitch from the surface E' F'. With this arrangement as is clearly shown by Fig. 14, the screw surfaces $A^{20}$ and $A^{21}$ of the ring section AB need not contact at any point with the mating surfaces $B^{21}$ and $B^{20}$ respectively of the ring section BB in the assembly of the ring, though when the ring is completely assembled the mating surfaces fit snugly together. The rod engaging surfaces of the two ring sections AB and BB are not identical in this case and it is theoretically impossible to move the larger section BB laterally on or off a rod on which the ring fits without distorting the ring section or rod. Practically, however, the fact that the ring is ordinarily of an internal diameter slightly greater than that of the rod coupled with the somewhat yielding character of the metal employed in packing rings, makes it possible to move packing ring segments formed in this manner on and off the rod to be packed. It is obvious of course that the clearance between the mating ends of the ring sections when partially assembled characteristic of the construction shown in Figs. 13 and 14 may be obtained by modifying both ends of each ring section. Furthermore, to obtain a clearance of this character, the modification of the screw ends of the ring sections may be carried out in such manner that the arc of engagement with the rod of one end of each of the two ring sections will be in excess of 180 degrees. In this case the excess for each ring section necessary for a given clearance will be less than in the larger ring when the excess is wholly confined to one ring section as shown in Figs. 13 and 14.

While in accordance with the provisions of the statutes, I have illustrated and described the best forms of my invention now known to me, it will be apparent to those skilled in the art that changes may be made in the form of the apparatus disclosed without departing from the spirit of my invention, and that under some conditions certain features of my invention may be used without a corresponding use of other features.

Having now described my invention, what I claim as new, and desire to secure by Letters Patent, is:

1. A ring composed of sections having mating screw end surfaces whereby the sections may be screwed together and apart on a rod on which the assembled ring fits.

2. A ring composed of two sections having mating screw end surfaces whereby the sections may be screwed together and apart on a rod on which the assembled ring fits, and each section having the inner margins of its two screw end surfaces terminating in helical and substantially diametrically opposed lines.

3. A ring composed of sections having mating screw end surfaces whereby the sections may be screwed together and apart on a rod on which the assembled ring fits, the screw surfaces at the opposite ends of each section being varied slightly from truly helical surfaces of the same pitch to provide clearance between the sections in assembling the ring.

4. A ring composed of sections having mating screw end surfaces whereby the sections may be screwed together and apart on a rod on which the assembled ring fits, the screw surfaces at the opposite ends of each section being of slightly different pitch whereby clearance between the sections in assembling the ring is provided.

5. A sectional metallic rod packing ring composed of two sections each adapted to be moved laterally off and onto a rod about which the ring fits, and each having mating screw end surfaces intersecting the inner curved wall of the ring at an acute angle.

6. A sectional metallic rod packing ring composed of two sections each adapted to be moved laterally off and onto a rod about which the ring fits, and each having mating screw end surfaces intersecting the inner curved wall of the ring at an acute angle, one screw surface at each joint being concave and the other convex.

CHARLES W. G. KING.

Witnesses:
 ARNOLD KATZ,
 D. STEWART.

Copies of this patent may be obtained for five cents each, by addressing the "Commissioner of Patents, Washington, D. C."